(12) United States Patent
Nelson et al.

(10) Patent No.: US 7,454,553 B2
(45) Date of Patent: Nov. 18, 2008

(54) POWER TRANSFER FIELD DEVICE

(75) Inventors: Richard L. Nelson, Chanhassen, MN (US); Marcos Peluso, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/393,005

(22) Filed: Mar. 29, 2006

(65) Prior Publication Data
US 2007/0233316 A1    Oct. 4, 2007

(51) Int. Cl.
*G06F 13/42* (2006.01)
*G06F 13/14* (2006.01)
*G06F 13/36* (2006.01)
*G06F 1/00* (2006.01)

(52) U.S. Cl. .................. 710/315; 710/105; 710/305; 713/310

(58) Field of Classification Search ............... 710/315, 710/105, 305; 713/310
See application file for complete search history.

(56) References Cited

U.S. PATENT DOCUMENTS

| | | | |
|---|---|---|---|
| 6,140,911 A | 10/2000 | Fisher et al. | 340/310.01 |
| 6,370,448 B1 | 4/2002 | Eryurek | 700/282 |
| 6,377,859 B1 | 4/2002 | Brown et al. | 700/79 |
| 6,959,356 B2 * | 10/2005 | Packwood et al. | 710/315 |
| 7,054,695 B2 * | 5/2006 | Opheim et al. | 700/83 |
| 7,228,186 B2 | 6/2007 | Karschnia et al. | 700/19 |
| 2004/0153594 A1 | 8/2004 | Rotvold et al. | 710/305 |
| 2004/0199681 A1 * | 10/2004 | Hedtke | 710/37 |
| 2005/0011278 A1 | 1/2005 | Brown et al. | 73/861.16 |
| 2005/0066104 A1 | 3/2005 | Train et al. | 710/305 |
| 2005/0245291 A1 * | 11/2005 | Brown et al. | 455/572 |
| 2006/0031577 A1 | 2/2006 | Peluso et al. | 709/243 |
| 2006/0155908 A1 * | 7/2006 | Rotvold et al. | 710/315 |
| 2006/0282580 A1 * | 12/2006 | Russell et al. | 710/62 |
| 2007/0019560 A1 | 1/2007 | Brewer et al. | 370/252 |

OTHER PUBLICATIONS

Search Report and Written Opinion of the European Patent Office in foreign application No. PCT/US2007/004098 filed Feb. 16, 2007.
U.S. Appl. No. 11/322,662, filed Dec. 30, 2005, Orth.

* cited by examiner

*Primary Examiner*—Ronald D Hartman, Jr.
(74) *Attorney, Agent, or Firm*—Christopher R. Christenson; Westman, Champlin & Kelly, P.A.

(57) ABSTRACT

An apparatus and method are provided for transferring electrical energy from a Fieldbus process communication loop to at least one other process communication loop operating in accordance with a different process communication protocol. A power transfer device is coupleable to a Fieldbus process communication loop and to a second process communication loop. The power transfer device is wholly powered by the Fieldbus process communication loop, and is configured to supply at least some electrical energy to the second process communication loop.

12 Claims, 5 Drawing Sheets

POWER TRANSFER FIELD DEVICE

BACKGROUND OF THE INVENTION

Process control systems, such as those used in chemical, petroleum or other processes, typically include at least one centralized process controller communicatively coupled to at least one host or operator work station and to one or more field devices via analog and/or digital buses or other communication lines or channels. The field devices, which may be, for example, valves, valve positioners, switches, process variable transmitters (e.g., temperature, pressure and flow rate sensors), et cetera, perform functions within the process such as opening or closing valves and measuring process parameters. The process controller receives signals indicative of process measurements made by the field devices and/or other information pertaining to the field devices via an input/output (I/O) device, uses this information to implement a control routine and then generates control signals which are sent over the buses or other communication channels via the input/output device to the field devices to control the operation of the process. Information from the field devices and the controllers is typically made available to one or more applications executed by the operator work station to enable an operator to perform any desired function with respect to the process, such as viewing the current state of the process, modifying the operation of the process, configuring the process, documenting the process, et cetera.

Over the last decade or so, smart field devices including a microprocessor and a memory have become prevalent in the process control industry. In addition to performing a primary function within the process, smart field devices may store data pertaining to the device, communicate with the controller and/or devices in a digital or combined digital and analog format, and perform secondary tasks such as self-calibration, identification, diagnostics, et cetera.

In the past, standard communication protocols were developed to enable controllers and field devices from different manufactures to exchange data using standard formats. In many cases, however, the variations in the communication protocols made them suitable for use in some environments while others were more suitable elsewhere, even within the same plant or facility. For example, a 4-20 milliampere (mA) protocol has good noise immunity but requires dedicated wiring. A high speed Ethernet (HSE) protocol may be fast but often requires expensive rewiring. Other protocols such as controller area network (CAN), HART®, H1, Foundation™ Fieldbus ("Fieldbus"), and others have features and drawbacks such as maximum length of cable run, multi-drop/single drop, intrinsically safe (for explosive environments), noise immunity, backward compatibility, supplemental power, et cetera. Sometimes the features often dictate the use of one protocol and its associated wiring even though it is not suitable for use in an entire plant or facility.

Interoperability between and/or among various process industry standard communication protocols has been under development recently. Technology exists for enabling cross-protocol communication. For example, U.S. patent application Ser. No. 10/354,525, entitled INTERFACE MODULE FOR USE WITH A MODBUS DEVICE NETWORK AND A FIELDBUS DEVICE NETWORK provides one exemplary illustration of data communication between two process industry standard communication protocols. While such cross-protocol communication represents a significant advance in the art of process communications monitoring and control, additional improvements can be made.

SUMMARY

An apparatus and method are provided for transferring electrical energy from a Fieldbus process communication loop to at least one other process communication loop operating in accordance with a different process communication protocol. A power transfer device is coupleable to a Fieldbus process communication loop and to a second process communication loop. The power transfer device is wholly powered by the Fieldbus process communication loop, and is configured to supply at least some electrical energy to the second process communication loop.

DETAILED DESCRIPTION

Embodiments of the present invention generally remove or otherwise divert a portion of excess electrical energy present in a Fieldbus process communication loop and provide such excess energy to a separate process communication loop operating in accordance with a different process communication standard protocol. Fieldbus is a communication protocol that defines a communication layer or protocol for transmitting information on a process control loop. A Fieldbus protocol specification is ISA—S50.01.1992, promulgated by the Instrument Society of America in 1992. As used herein "Fieldbus" is intended to encompass any process communication loop that complies with the specification listed above, either or directly or backwardly. The Fieldbus protocol is an all-digital communication protocol developed for use in process control networks. In particular, the Fieldbus protocol, and the manner of communicating with and storing data in devices using the fieldbus protocol, is described in detail in the Fieldbus Foundation manuals entitled Communications Technical Specification and User Layer Technical Specification.

The Fieldbus protocol is an all digital, serial, two-way communication protocol that provides a standardized physical interface to a two-wire loop or bus interconnecting field equipment or devices such as sensors, transmitters, actuators, controls, valves, et cetera located in an instrumentation or process control environment such as a factory or a plant. The Fieldbus protocol provides, in effect, a local area network for field instruments or devices within a process, which enables these field devices to perform control functions at locations distributed throughout a process facility and to communicate with one another before and after performance of these control functions to implement an overall control strategy.

Figure 1:
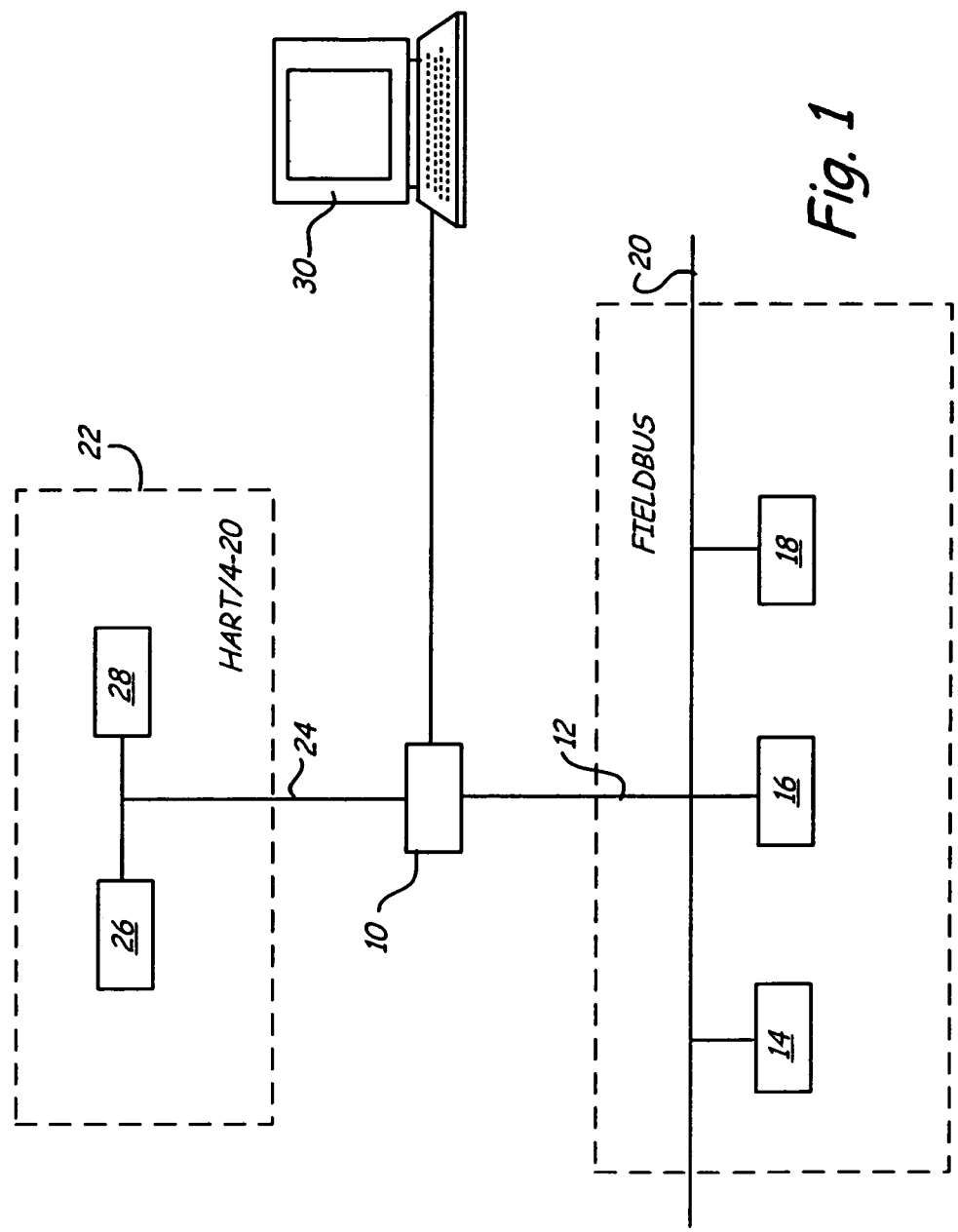
FIG. 1 is a diagrammatic view of a pair of process control networks coupled together by a power transfer device in accordance with an embodiment of the present invention.

FIG. 1 is a diagrammatic view of a pair of process control networks coupled together by a power transfer device in accordance with an embodiment of the present invention. Power transfer device 10 is coupled to Fieldbus communication loop 12, which loop 12 is coupled to Fieldbus devices 14, 16 and 18. Fieldbus devices 14, 16 and 18 can be any suitable field devices including controllers, process variable transmitters, valves, valve actuators or other field devices. FIG. 1 illustrates Fieldbus loop 12 continuing along line 20 indicating that additional Fieldbus field devices may be coupled thereto. Moreover, Fieldbus communication loop 12 is coupled to a source of electrical energy, such as a control room. In accordance with an embodiment of the present invention, power transfer device 10 is also coupled to at least a second process communication network 22 along bus 24, which bus 24 is coupled to field devices 26 and 28. In one example, second process communication network 22 is a process communication network that operates in accordance with the HART® process communication protocol. Second communication network 22 is illustrated as a HART network, but those skilled in the art will recognize that network 22 can be any non-Fieldbus network including, but not limited to: Modbus (RS45) protocol, controller area network (CAN) protocol, wireless communication, lower power voltage indications, and 4-20 milliamp process communication signaling.

As illustrated in FIG. 1, process communication network 22 does not require that bus 24 extend to additional devices to receive electrical power. Instead, power transfer device 10, in accordance with an embodiment of the present invention, transfers at least some excess electrical energy from Fieldbus process communication loop 12 to second process communication bus 24. This provides the operating energy to energize and interoperate with field devices 26 and 28 which communicate in accordance with the second process communication protocol. Optionally, power transfer device 10 may be coupled to a computer or workstation 30 for configuration and/or monitoring. Additionally, it is conceivable that the coupling between the computer or workstation 30 and power transfer device 10 may be effected via communication through Fieldbus communication loop 12.

Figure 2:
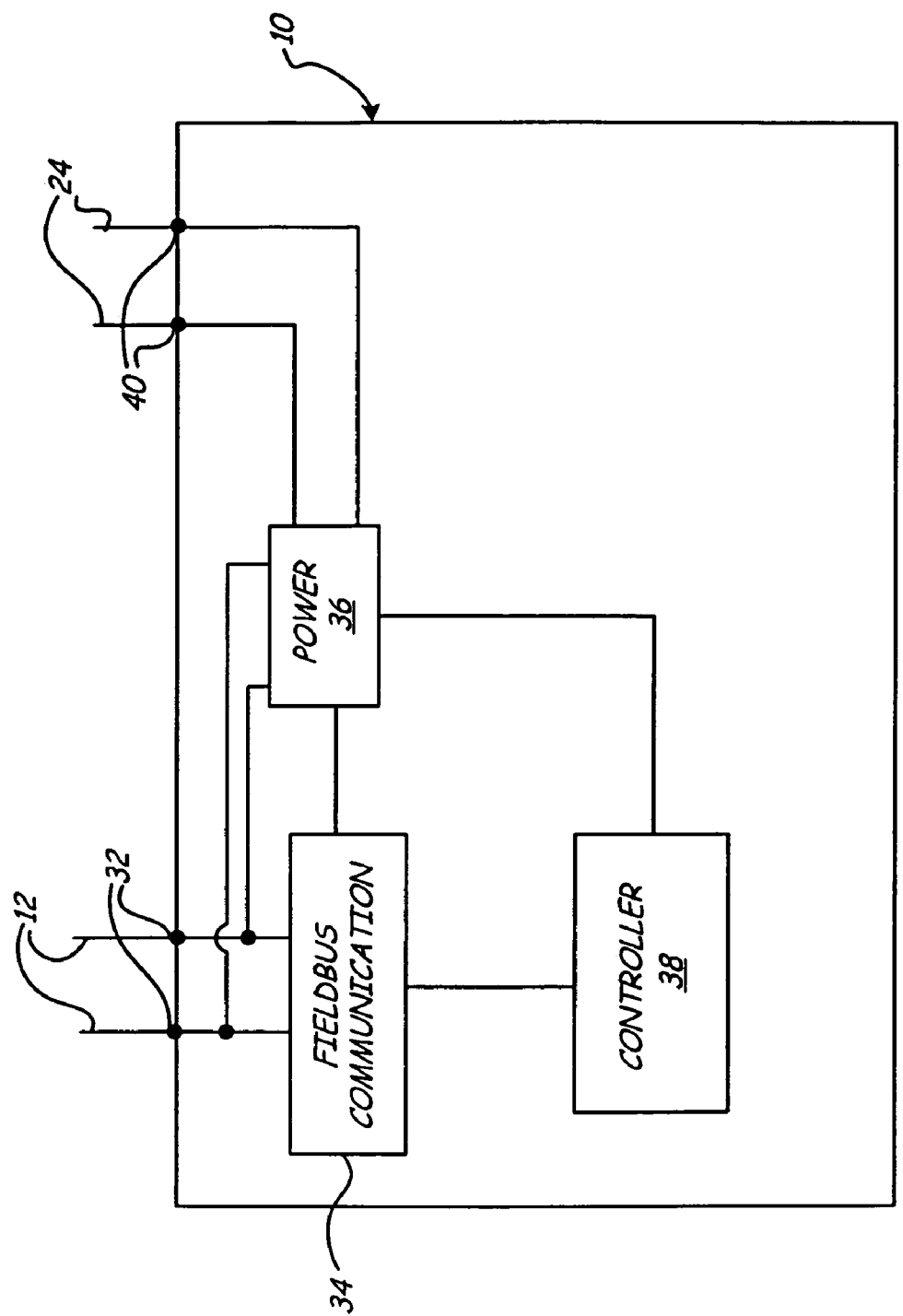
FIG. 2 is a diagrammatic view of power transfer device in accordance with an embodiment of the present invention.

FIG. 2 is a diagrammatic view of power transfer device 10 in accordance with an embodiment of the present invention. Power transfer device 10 includes a plurality of terminals 32 that are coupleable to Fieldbus process communication loop 12. Fieldbus communication model 34 can be any suitable Fieldbus communication module now commercially available or later developed which is able to transmit data on Fieldbus communication loop 12 in accordance with the Fieldbus specifications. Power module 36 is coupled to terminals 32 and receives electrical power from Fieldbus communication loop 12 and provides electrical power to fieldbus communication module 34 and controller 38 such that device 10 is wholly powered by electrical energy received from the Fieldbus communication loop. Power module 36 is also coupled to a plurality of terminals 40, which terminals 40 are coupleable to second process communication loop 24. In this manner, power module 36 is able to receive at least some electrical energy from Fieldbus communication loop 12, and provide electrical energy to loop 24. Moreover, power module 36 may, under the command of controller 38, selectively allow or inhibit transfer of electrical energy from loop 12 to loop 24.

Figure 3:
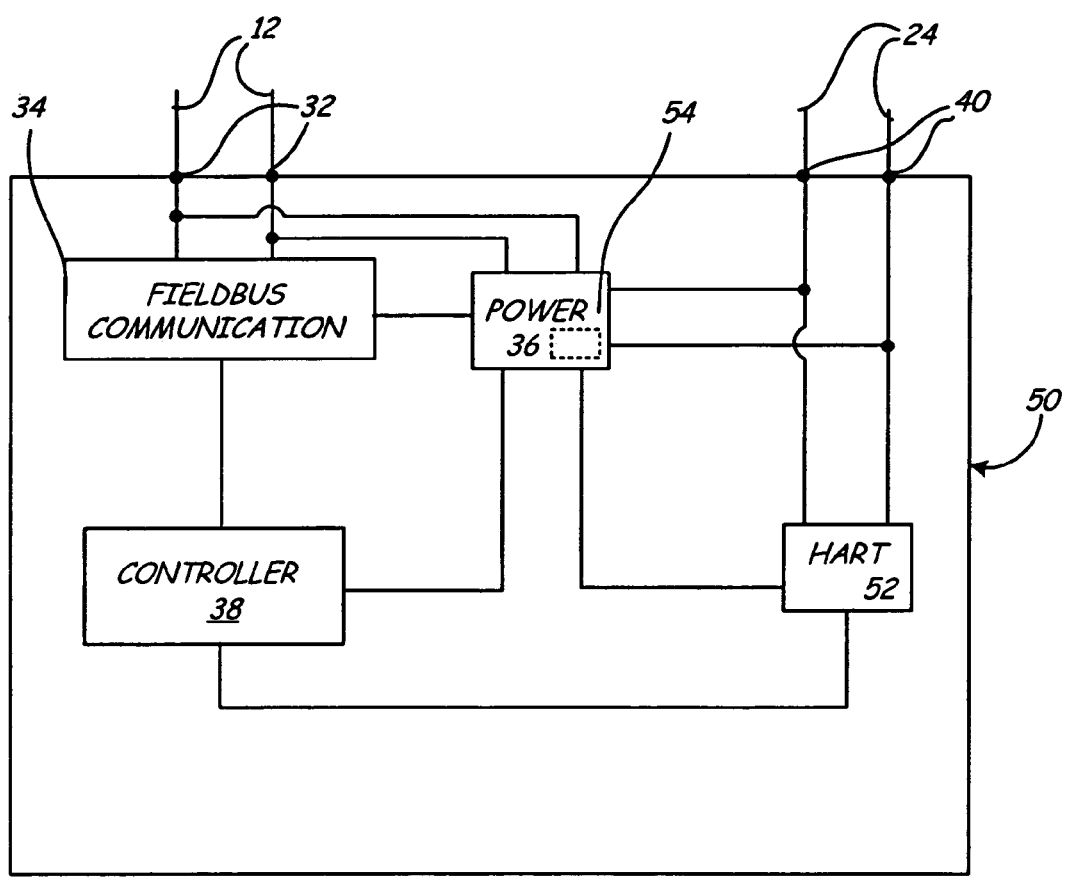
FIG. 3 is a diagrammatic view of power transfer device in accordance with another embodiment of the present invention.

FIG. 3 is a diagrammatic view of power transfer device 50 in accordance with another embodiment of the present invention. Device 50 is similar in many respects to device 10 and like components are numbered similarly. However, device 50 includes second communication module 52 which, in one embodiment, is a HART communication module. HART communication module 52 is powered by energy received from power module 36 and is coupled to terminals 40. Module 52 is adapted for communication in accordance with the second communication protocol. Accordingly, module 52 may transmit data on and receive data from second process communication loop 24. Accordingly, module 52 allows controller 38 to interact with one or more field devices upon second process communication loop 24. While FIG. 3 illustrates module 52 as providing a HART communication module, any communication module in accordance with any suitable process communication standard can be used, for example, module 52 can allow communication with the Modbus (RS45) protocol, controller area network (CAN) protocol, wireless communication, lower power voltage indications, and 4-20 milliamp process communication signaling. Examples of wireless communications usable for module 52 include, but are not limited to: wireless networking technologies (such as IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Service (GPRS), Code Division Multiple Access (CDMA), spread spectrum technology, infrared communications techniques, SMS (Short Messaging Service/text messaging), or any other suitable wireless technology.

It is contemplated that embodiments of the present invention are also applicable to situations or applications where the amount of energy required to energize the second process communication loop exceeds that available in a steady state condition on the Fieldbus process communication loop. In such instances, it is useful for power module 36 to include energy storage element 54 illustrated in phantom in FIG. 3. Thus, the maximum available excess energy from the Fieldbus process communication loop is scavenged or siphoned for use with embodiments of the present invention. Then, when sufficient energy exists within energy storage device 54 to energize second process communication loop 24, controller 38 causes power module 36 to provide the energy stored in storage device 54 to second process communication loop. When energy storage device 54 is sufficiently depleted, or the process operation is finished, controller 38 causes power module 36 to inhibit the transfer of energy to second process commination loop 24 and the excess energy begins to be stored again in storage device 54. This process can repeat at periodic intervals, or can be engaged automatically or manually upon the receipt of a command by device 50 through the Fieldbus communication network 12, or by an operator interacting with a local operator interface of device 50.

Figure 4:
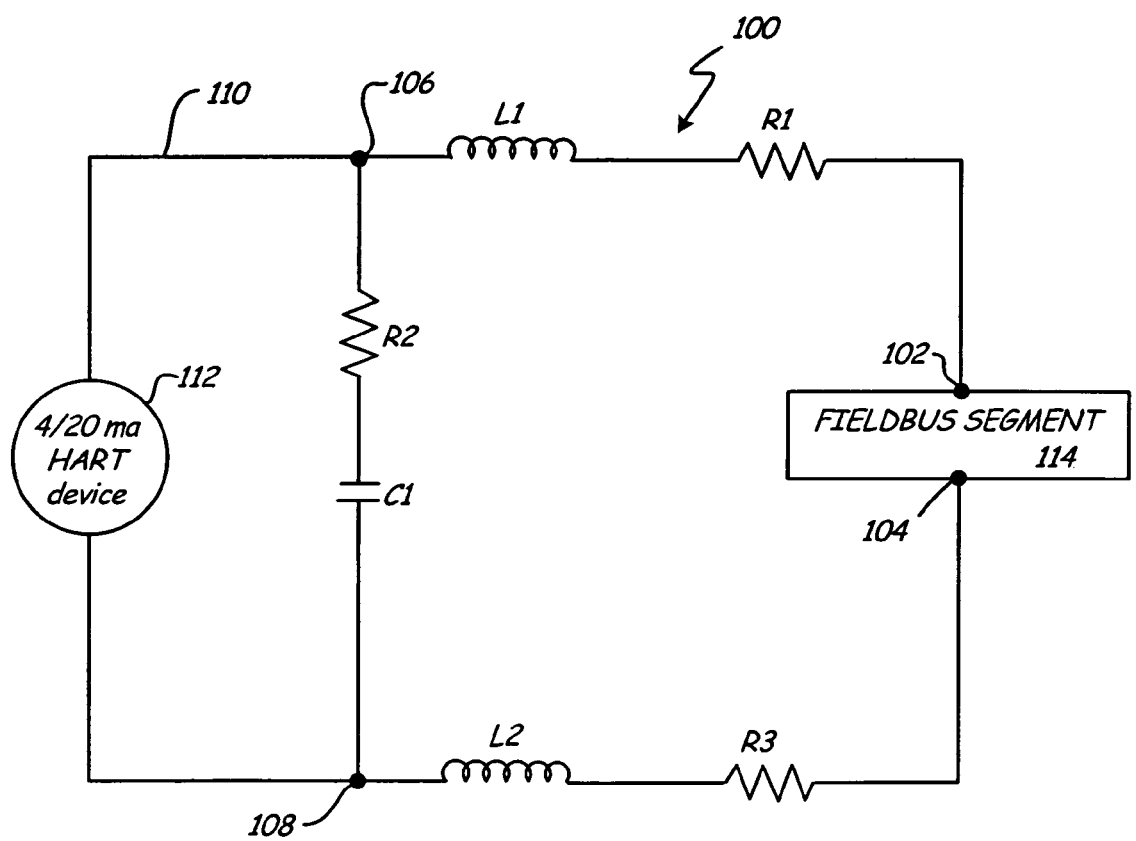
FIG. 4 is a circuit diagram of a passive circuit for transferring electrical energy from a Fieldbus segment to a field device operating in accordance with a different process communication protocol.

FIG. 4 is a circuit diagram of a circuit for tapping, or otherwise transferring electrical energy from a Fieldbus segment to a field device operating in accordance with a different process communication protocol. Circuit 100 is coupled to fieldbus segment 114 at terminals 102, 104. Terminal 102 is electrically coupled to terminal 106 via inductor L1 and resistor R1 which are coupled in series therebetween. Similarly, terminal 108 is coupled to terminal 104 via series inductor L2 and resistor R3. Finally, terminals 106 and 108 are electrically coupled together via resistor R2 which is arranged in series with capacitor C1. The second process communication loop 110 (in this example a 4-20 milliamp HART loop) is coupled to terminals 106 and 108 and allows 4-20 milliamp HART device 112 to derive all required operating power from loop 110. The circuit 100 illustrated in FIG. 4 provides electrical energy to be tapped from Fieldbus segment 114 using energy storage elements and active and/or passive filters in such a way that prevents the 4-20 milliamp HART® signal and the Fieldbus signal from interfering with each other. The actual values for elements L1, L2, R1, R2, R3 and C1 can be tailored for each application. Moreover, circuit 100 can be embodied within device 10, device 50, or any other suitable field device that is coupleable to a Fieldbus process communication loop and for which providing additional power to a second process communication loop would be beneficial. Thus, circuit 100 can be embodied within a process variable transmitter, a valve, a valve actuator, a controller, or any other suitable field device.

Figure 5:
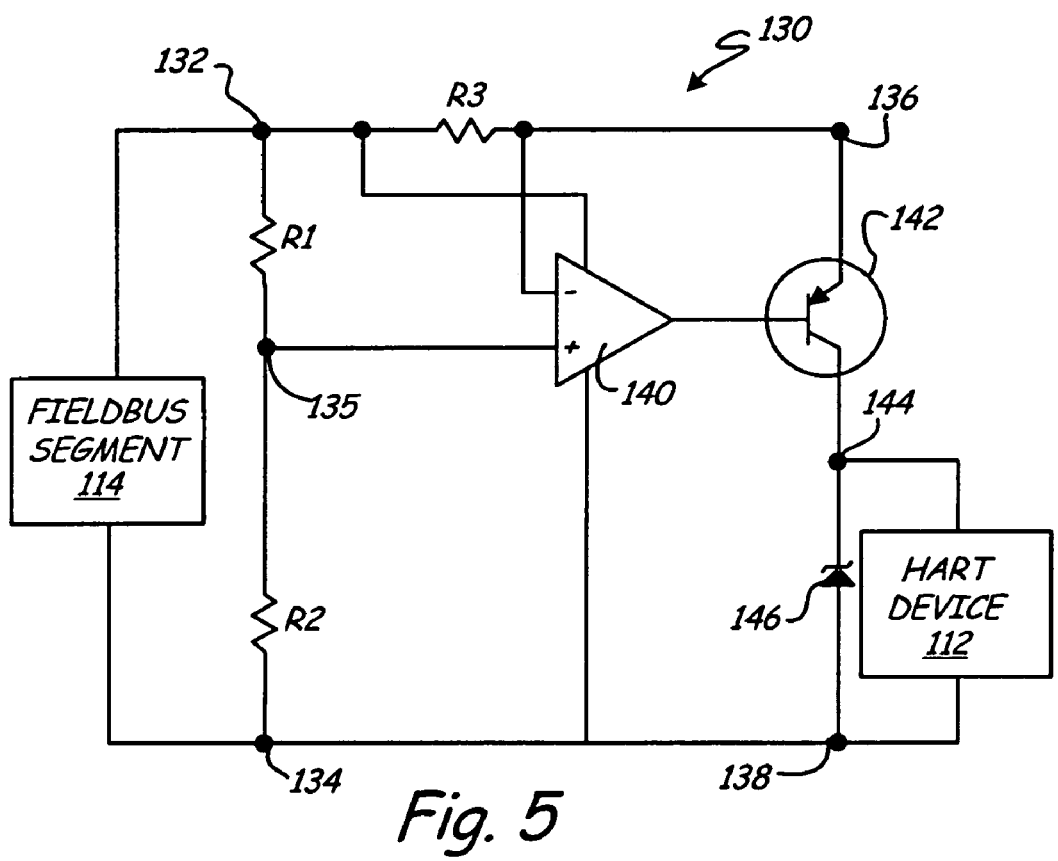
FIG. 5 is a circuit diagram of an active circuit for transferring electrical energy from a Fieldbus segment to a field device operating in accordance with a different process communication protocol.

FIG. 5 is a circuit diagram of another circuit for transferring electrical energy from a Fieldbus segment to a field device operating in accordance with a different process communication protocol. Circuit 130 employs active circuit components to transfer at least some electrical energy from Fieldbus segment 114 to HART device 112. Fieldbus segment 114 is coupled to nodes 132 and 134 of circuit 130. Node 134 is coupled to node 138, which is directly coupled to HART device 112. Resistors R1 and R2 are arranged in series between nodes 132 and 134, with node 135 being disposed therebetween. Node 135 is coupled to the non-inverting input of op-amp 140, while the inverting input of op-amp 140 is coupled to node 132 through resistor R3. The output of op-amp 140 is coupled to the base of PNP transistor 142. The emitter of transistor 142 is coupled to node 136 which is coupled to the inverting input of op-amp 140. The collector of transistor 142 is coupled to node 144, which is coupled to HART device 112. Zener diode 146 is disposed between nodes 144 and 138.

Although the present invention has been described with reference to preferred embodiments, workers skilled in the art will recognize that changes may be made in form and detail without departing from the spirit and scope of the invention.

What is claimed is:

1. A field device comprising:
   a Fieldbus communication module operably coupleable to a Fieldbus process communication loop;
   a power module coupleable to the Fieldbus process communication loop, the power module being configured to wholly power the field device with energy received from the Fieldbus process communication loop;
   a controller coupled to the Fieldbus communication module and the power module;
   a plurality of terminals operably coupled to the power module and coupleable to a second, non-Fieldbus process communication loop, to provide electrical energy over the second, non-Fieldbus process communication loop; and
   an energy storage device operably coupled to the controller and configured to provide a power level to the second, non-Fieldbus process communication loop that is greater than steady-state excess energy available on the Fieldbus process communication loop.

2. The field device of claim 1, wherein the controller is configured to selectively cause the power module to provide the electrical energy to the second, non-Fieldbus process communication loop.

3. The field device of claim 1, and further comprising a second, non-Fieldbus communication module coupled to the controller and to the plurality of terminals.

4. The field device of claim 3, wherein the second, non-Fieldbus communication module is a 4-20 mA module.

5. The field device of claim 4, wherein the 4-20 mA module is adapted to communicate in accordance with the HART protocol.

6. The field device of claim 3, wherein the second, non-Fieldbus communication module is adapted to communicate in accordance with the Modbus protocol.

7. The field device of claim 3, wherein the second, non-Fieldbus communication module is adapted to communicate in accordance with the controller area network (CAN) protocol.

8. The field device of claim 3, wherein the second, non-Fieldbus communication module is adapted to communicate in accordance with a wireless protocol.

9. The field device of claim 1, wherein the controller is configured to periodically energize the second, non-Fieldbus process communication loop.

10. The field device of claim 1, wherein the controller is configured to energize the second, non-Fieldbus process communication loop in response to a command received through the Fieldbus communication module.

11. A method for injecting electrical energy into a non-Fieldbus process communication loop, the method comprising:
    coupling a passive circuit to a Fieldbus process communication loop; and
    transferring at least some electrical energy from the Fieldbus process communication loop to the non-Fieldbus process communication loop through the passive circuit at a rate that exceeds steady-state excess energy available on the Fieldbus process communication loop.

12. A method for injecting electrical energy into a non-Fieldbus process communication loop, the method comprising:
    coupling an active circuit to a Fieldbus process communication loop; and
    transferring at least some electrical energy from the Fieldbus process communication loop to the non-Fieldbus process communication loop through the active circuit at a rate that exceeds steady-state excess energy available on the Fieldbus process communication loop.

* * * * *